W. SCHUM.
LOCKING NUT.
APPLICATION FILED FEB. 26, 1913.

1,086,788.

Patented Feb. 10, 1914.

Witnesses
Henry J. Lucke
Thomas Howe

Inventor
William Schum,
By his Attorneys
Edwards, Sager & Wooster

UNITED STATES PATENT OFFICE.

WILLIAM SCHUM, OF NEW YORK, N. Y.

LOCKING-NUT.

1,086,788.  Specification of Letters Patent. Patented Feb. 10, 1914.

Application filed February 26, 1913. Serial No. 750,740.

*To all whom it may concern:*

Be it known that I, WILLIAM SCHUM, a citizen of the United States, residing at New York, in the county of New York and State of New York, have invented certain new and useful Improvements in Locking-Nuts, of which the following is a full, clear, and exact specification.

This invention relates to locking nuts, and is particularly directed to improvements whereby the nut or equivalent rotatable member is firmly secured against accidental rotation.

In accordance with my invention, an externally threaded bolt, axle or the like, is provided with a recess or slot passing transversely through the threaded portion thereof, which recess or slot is preferably very short as compared with the length of the threaded portion. Within the recess or slot is disposed a longitudinally movable locking member having its opposite ends similarly threaded. The locking member is movable longitudinally in the slot, so that in one position, its threads coincide with the external threads, and in another position they are displaced and thereby effect the lock by preventing relative rotation between the exteriorly and interiorly threaded members. The locking member is moved to locking position by a spring, and to unlocking position by a set screw or the like. The nut or interiorly threaded member is longitudinally slotted at diametrical points, whereby the locking element is permitted to be moved from unlocking to locking position, or vice versa, under action of the set screw and spring, respectively.

In accordance with my invention, the tensile, bending and shearing strength of the bolt, axle or the like, is substantially unimpaired notwithstanding the recess for the locking member; furthermore, no special or additional means is necessary for holding the locking member within the recess or slot, since the spring serves also to support the locking element in position. The recess for the locking member is preferably positioned so that the nut when in final position will completely inclose the locking member; whereby, upon sealing the opening into which the set screw is tapped, protection is secured against meddling by unauthorized parties.

Further objects and features of my invention will be understood from the following description, and from the accompanying drawings, in which—

Figure 1:
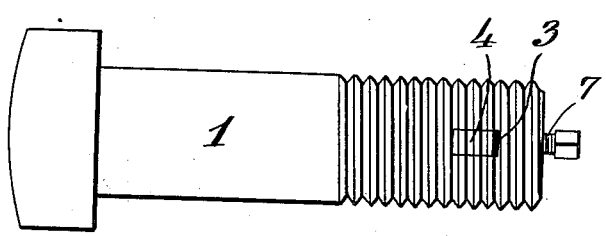
Figure 2:
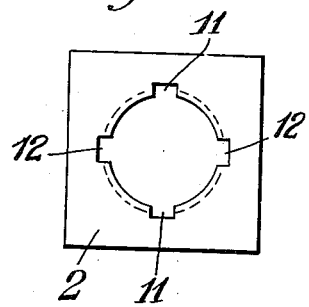
Figure 3:
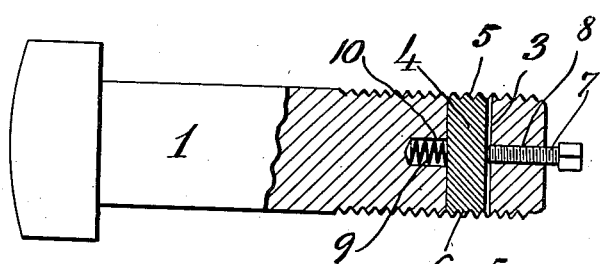
Figure 4:
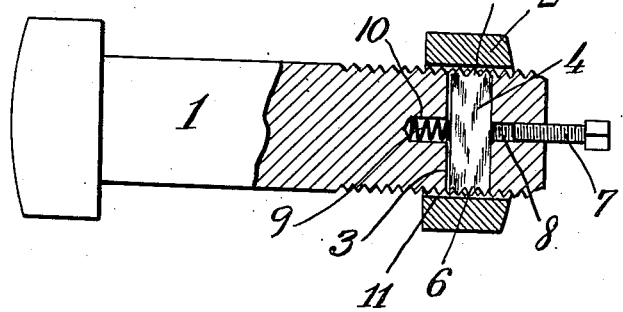
Figure 5:
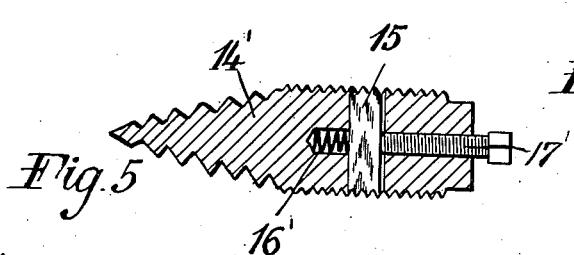

Figures 1 and 2 show a bolt and nut embodying my invention; Figs. 3 and 4 are sectional elevations of the bolt of Fig. 1, showing the locking member in unlocked and locked positions, respectively; Fig. 5 shows a lag screw embodying my invention; and Fig. 6 indicates a rail secured by lag screws embodying my invention.

Referring to the drawings, the exteriorly threaded member 1 is threaded at one end to receive the interiorly threaded member 2. At a point intermediate the ends of the threaded portion of member 1 is drilled or bored a squared recess 3 in which is disposed the locking element 4 of less width than the width of the recess 3. The pitch of the thread at ends 5, 6 is the same as the pitch of the thread of the member 1. The set screw 7 is threaded in the bore 8, shown as passing centrally therein; the set screw may be of a length slightly greater than the length of the bore 8. The spring 9 is disposed in the bore 10, on the opposite side of recess 3 from the bore 8. Normally, the spring 9 forces the locking element 4 so that the opposite ends 5, 6 are out of register with the threads of the bolt. When the set screw 7 is turned sufficiently to move the locking element 4 against the action of the spring 9 to its other limiting position, the thread of the ends 5, 6 are then in register with the exterior thread, and the interiorly threaded member may now be moved to any desired relative position without interference by the locking element. It will be noted that when the member 2 is in position and the set screw 7 released, or withdrawn out of the bore 8, the locking element 4 will be forced under action of the spring 9 to its locking position upon relative rotation, so that one set of recesses 11, 12 are in alinement with the locking element 4. The member 2 is shown provided with two sets 11, 12 of diametrically disposed recesses corresponding in width to the width of the locking element 4; however, one or three or more sets may be provided, as will be understood.

When the exteriorly threaded member is made of cast material, the recess or slot may be formed while casting; or the recess may be cut by drilling, or the like. Preferably, the locking element is made of highly tempered iron or steel, and the spring is preferably a spiral of hard tempered steel. It will be noted that the spring 10 serves to effect the movement of the locking element from unlocking to locking position, and at the same time holds the locking element in position within the recess or slot.

If it is desired to maintain any given locking position, the set screw 7 may be withdrawn, and the bore 8 filled with solder, melted lead, or the like. This feature of my invention is advantageous for fastenings employed in the construction of bridges, locomotives, railroad cars, railroad tracks, and other iron structures, etc. As will be clear from the above, my invention is also applicable for locking the wheels on the axles of automobiles, wagons, etc.

Figure 6:
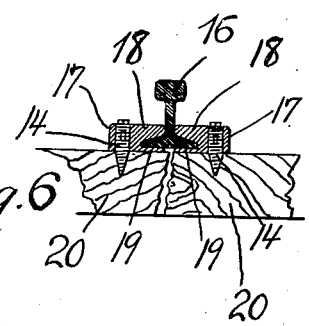

In Fig. 5 is illustrated an exteriorly threaded member formed as a lag screw 14' provided with the locking element 15 disposed adjacent the head of the screw, with a spring 16' and set screw 17' arranged similarly as described above. The head of the lag screw 14' is provided with an exterior thread for receiving an interiorly threaded member having diametrically disposed recesses corresponding to the dimensions of the locking element 15, as will be clear from the above description. This form of my invention is particularly applicable as a substitute for spikes employed for securing rails to ties in the construction of a railroad track, as indicated in Fig. 6; in this Fig. 6 I illustrate the rail 16 held by stationary members 17 having extended heads 18 and lower projections 19 for holding the lower flange of the rail 16. As shown, the members 17 are secured by lag screws 14 to succeeding wood ties 20 on alternate sides of the rail. In this form, the screw 14 is more conveniently turned relatively to the stationary member.

The location and dimension of the transverse recess 3 may be chosen so that the member 2 when in final or tightened position will inclose the locking member 4, and accordingly by sealing the bore 8, as described, the locking parts will be protected exteriorly and interiorly from being tampered with.

It will be seen that my invention is simple in construction, and secures the members against rotation by means of an interiorly disposed or self-contained locking arrangement, and at the same time retaining the original strength of the fastening.

It will be understood that various changes and modifications may be made without departing from my invention within the scope of the appended claims.

Having thus described my invention, I declare that what I claim as new and desire to secure by Letters Patent is:

1. The combination with an exteriorly threaded member having a recess intermediate the threaded portion thereof, of locking means disposed in said recess, said locking means being movable within said recess longitudinally of the threaded member, a spring seated within the threaded member for moving said locking means toward one end of said threaded member to locked position, a longitudinally movable element disposed in a bore in said externally threaded member for holding said locking means in unlocked position, and a longitudinally slotted interiorly threaded member permitting said locking means to move to locked position under action of said spring at a predetermined position of said members when said longitudinally movable element is withdrawn.

2. The combination with an exteriorly threaded member having a transverse recess intermediate the threaded portion thereof, of a locking element disposed in said recess and threaded to correspond to the thread of said threaded member, said locking element being movable within said recess longitudinally of the threaded member, a spring disposed on one side of said locking element, a set screw tapped in the threaded member on the opposite side of said locking element, and a longitudinally slotted interiorly threaded member permitting movement of said locking member at predetermined positions of said threaded members.

3. The combination with an exteriorly threaded member having a recess passing transversely through the threaded portion thereof, of a locking element movable in said recess and having threaded ends of the same pitch as the thread of the threaded member, an interiorly threaded member having diametrical slots corresponding to the ends of said locking element, a spring disposed in a longitudinal recess in the exteriorly threaded member on one side of said transverse recess, said spring serving to support said locking element within said transverse recess, and axially movable means for moving said locking element against the action of said spring, said means passing through a longitudinal recess in said exteriorly threaded member on the side of said transverse recess opposite to said first-named longitudinal recess.

4. The combination of an exteriorly threaded member having a recess passing transversely through the threaded portion thereof intermediate its ends, an interiorly threaded member of greater thickness than the axial length of said recess, a locking member axially movable in said recess, said exteriorly threaded member having a recess through which to control said locking member.

5. The combination with an exteriorly threaded member having a recess passing transversely through the threaded portion thereof, of a locking element disposed in said recess and having threaded ends corresponding to the thread of said threaded member, said locking element being movable within said recess longitudinally of the threaded member, a spring disposed on one side of said locking element, an axial bore in the threaded member on the opposite side of said locking element through which to control said locking member, and an interiorly threaded member having diametrical slots corresponding to the ends of said locking element, the thickness of said latter member being greater than the axial length of said locking element.

In testimony whereof I affix my signature in presence of two witnesses.

WILLIAM SCHUM.

Witnesses:
    HENRY J. LUCKE,
    GEO. N. KERR.